Patented Nov. 4, 1947

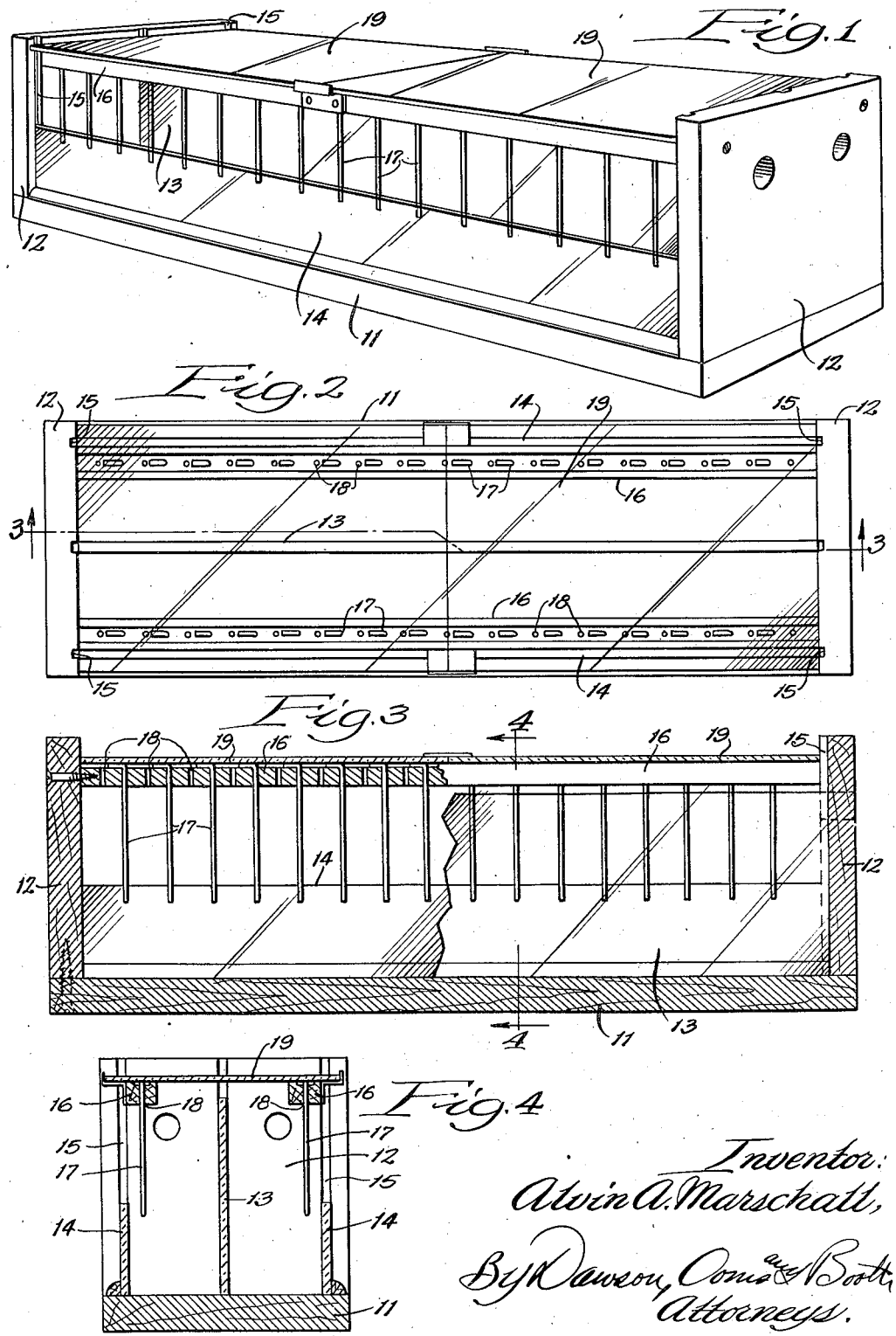

2,430,234

UNITED STATES PATENT OFFICE 2,430,234

CHICK FEEDER

Alvin A. Marschall, Chicago, Ill.

Application November 29, 1943, Serial No. 512,166

4 Claims. (Cl. 119—61)

This invention relates to a chick feeder and has for its principal object the provision of an improved chick feeder which may be easily and cheaply made from familiar materials.

A further object of the invention is to provide a chick feeder which is adjustable to permit the adjustment of the feeder for larger chicks and chickens without the use of any tools.

A further object of the invention is to make a chick feeder that is compact in form; that will display the feed regardless of how little is left in the troughs; that will protect the feed against dirt and contamination; and that will prevent the chicks from walking in the feed.

A further object of the invention is to provide a chick feeder that will enable the use of two kinds of feed, equally visible and accessible to the feeding chicks.

A further object of the invention is to prevent the chickens from entering the feeder to kick food out of the feeding troughs.

A further object of the invention is to expose the food to full view at all times to induce heavier feeding.

Other objects, advantages and capabilities of the invention will appear from the following description thereof, taken in conjunction with the accompanying drawing in which—

Fig. 1 is a perspective view of the complete chick feeder;

Fig. 2 is a plan view of the chick feeder;

Fig. 3 is an elevation, partly in section, taken on the line 3—3 of Fig. 2; and

Fig. 4 is a transverse elevation in section taken on the line 4—4 of Fig. 3.

Referring to the drawing, the frame of the chick feeder is constructed of the base 11 and two ends 12. These may be made of wood or other familiar structural materials. The body of the chick feeder may be divided along its middle, throughout its length, by a plate 13 which divides the chick feeder into two equal halves. This plate may extend from the base 11 to the top of the feeder or may be of any suitable height, depending upon the quantity of feed which it is desired to retain within the feeding troughs. The plate may be made removable for cleaning and is preferably made of glass to render the feed on both sides visible to a feeding chick.

The feeding troughs are formed by the dividing plate 13 and the side walls 14, which are preferably made of glass and are mounted in the trough ends 12 by being dropped into the channels 15. These channels may either be cut into the feeder ends 12 or may be metal channels attached thereto. The trough walls 14 are made readily removable so that as the chicks are small, low walls may be used and as the chicks increase in size walls of greater height may be employed both to increase the capacity of the feeding troughs and to bring the level of the feed to the height most convenient for the chicks.

Running the full length of the trough and secured to each end of the feeder are the rails 16. These are preferably mounted near the top of the feeder and provide means for mounting and locating the bars 17 which may be made of wire or short metal rods in the form of an inverted L. These are merely dropped through the holes 18 in the rails 16. The holes 18 are spaced throughout the length of the rails 16 so that when the chicks are small the bars 17 may be located close together and as the chicks increase in size, intervening bars may be removed so as to increase the space between the bars to enable larger chicks to get their heads into the feeding trough and still keep the chicks themselves from climbing into the trough and scattering the feed about.

The feeder is surmounted by the top 19 which may be made in the form of one or more plates, preferably of glass. These plates extend from one end of the trough to the other and rest upon the rails 16.

By employing glass plates for the side walls 14 and the top 19 and the dividing wall 13, the food is at all times fully lighted and exposed to full view. This has been known to increase the feeding by the chicks.

In operation the feeder may be readily assembled and the requisite number of bars dropped through the rails 16 and the trough walls 14 dropped into place with the dividing wall 13 located at the middle of the feeder.

The troughs formed between the dividing wall 13 and the side walls 14 may be filled with feed and the cover 19 placed over the feeder.

To fill the feeder it is necessary merely to lift the top 19 from the feeder and put the desired grain or other food in the respective troughs.

As the chicks increase in size some of the bars 17 may be lifted out of the rails and, if desired, wall plates 14 of greater height may be inserted to increase the capacity of the feed troughs and also to bring the food to a higher level for easier access by the chicks.

While the invention has been disclosed in connection with specific details of a preferred embodiment thereof, it must be understood that the materials and dimensions may be varied to suit the requirements and the details shown are not intended to be limitative of the invention except insofar as set forth in the accompanying claims.

Having thus described my invention, what I claim as new and desire to secure by Letters Patent of the United States is:

1. A chick feeder comprising a base, end walls secured to each end of the base and provided with vertically arranged channels, removable side walls of less height than the end walls and held in place by the channels, longitudinal rails connecting the end walls near the top thereof and provided with a plurality of spaced holes, removable vertically arranged bars extending through the spaced holes and provided with stops at their upper ends for suspending the bars in spaced relation below the rails and in close proximity to the removable side walls, and a removable cover supported by the longitudinal rails and holding the bars in place.

2. A chick feeder comprising a base, end walls secured to each end of the base and provided with vertically arranged channels, a removable vertical middle partition between the end walls and held in place by the channels, removable side walls of less height than the end walls and held in place by the channels, longitudinal rails connecting the end walls near the top thereof and provided with a plurality of spaced holes, removable vertically arranged bars extending through the spaced holes and provided with stops at their upper ends for suspending the bars in spaced relation below the rails and in close proximity to the removable side walls, and a removable cover supported by the longitudinal rails and holding the bars in place.

3. A chick feeder comprising a base, end walls secured to each end of the base and provided with vertically arranged channels, removable transparent side walls of less height than the end walls and held in place by the channels, longitudinal rails connecting the end walls near the top thereof and provided with a plurality of spaced holes, removable vertically arranged bars extending through the spaced holes and provided with stops at their upper ends for suspending the bars in spaced relation below the rails and in close proximity to the removable side walls, and a transparent removable cover supported by the longitudinal rails and holding the bars in place.

4. A chick feeder comprising a base, end walls secured to each end of the base and provided with vertically arranged channels, a removable transparent vertical middle partition between the end walls and held in place by the channels, removable transparent side walls of less height than the end walls and held in place by the channels, longitudinal rails connecting the end walls near the top thereof and provided with a plurality of spaced holes, removable vertically arranged bars extending through the spaced holes and provided with stops at their upper ends for suspending the bars in spaced relation below the rails and in close proximity to the removable side walls, and a transparent removable cover supported by the longitudinal rails and holding the bars in place.

ALVIN A. MARSCHALL.

REFERENCES CITED

The following references are of record in the file of this patent:

UNITED STATES PATENTS

| Number | Name | Date |
|---|---|---|
| 908,217 | Dougan | Dec. 29, 1908 |
| 1,209,853 | Kohnen | Dec. 26, 1916 |
| 1,413,458 | Collis | Apr. 18, 1922 |
| 1,465,327 | Allen | Aug. 21, 1923 |
| 1,808,433 | Poorman | June 2, 1931 |